(12) United States Patent
Rogers et al.

(10) Patent No.: US 11,058,990 B1
(45) Date of Patent: Jul. 13, 2021

(54) APPARATUS AND METHOD FOR CARBON DIOXIDE REMOVAL

(71) Applicant: USA as represented by the Administrator of the National Aeronautics and Space Administration, Washington, DC (US)

(72) Inventors: Tanya K. Rogers, Seabrook, TX (US); John Graf, Seabrook, TX (US); Mark Weislogel, Portland, OR (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 197 days.

(21) Appl. No.: 16/450,124

(22) Filed: Jun. 24, 2019

Related U.S. Application Data

(60) Provisional application No. 62/690,075, filed on Jun. 26, 2018.

(51) Int. Cl.
*B01D 53/14* (2006.01)
*B01D 53/18* (2006.01)
(Continued)

(52) U.S. Cl.
CPC ..... *B01D 53/1475* (2013.01); *B01D 53/1425* (2013.01); *B01D 53/18* (2013.01); *B01D 53/62* (2013.01); *B01D 53/78* (2013.01); *B01D 53/96* (2013.01); *B01D 2252/20405* (2013.01); *B01D 2252/20421* (2013.01);
(Continued)

(58) Field of Classification Search
CPC ............ B01D 53/1475; B01D 53/1425; B01D 53/18; B01D 53/62; B01D 53/78; B01D 53/96; B01D 2252/20405; B01D 2252/20421; B01D 2252/20426;
(Continued)

(56) References Cited

U.S. PATENT DOCUMENTS

| | | |
|---|---|---|
| 8,317,906 B2 | 11/2012 | Bansal |
| 8,709,367 B2 | 4/2014 | Pinard Westendorf et al. |

(Continued)

*Primary Examiner* — Cabrena Holecek
(74) *Attorney, Agent, or Firm* — Theodore U. Ro; Edward K. Fein

(57) ABSTRACT

A system and method for removing one or more predetermined gases from an environment is herein disclosed. An embodiment of the system and method will now be described. A means for conveying a fluid and a means for flowing the fluid is combined with adsorber and desorber sections. The fluid flows in the means for conveying the fluid by the means for flowing the fluid. Comparably, the fluid flows in the adsorber and desorber sections not by the means for flowing the fluid, but rather by capillary action. In the adsorber section, the environment is in direct contact with the fluid. The fluid is capable for adsorbing one or more gases from the environment. The fluid exits the adsorber section and subsequently flows into the desorber section. The desorber section is self-contained wherein an inner portion of the desorber section is not in direct contact with the environment. In the desorber section, the one or more gases are desorbed from the fluid into the inner portion of the desorber section. In an embodiment, the one or more gases exit the desorber section and the system as a whole.

17 Claims, 13 Drawing Sheets

(51) Int. Cl.
  *B01D 53/62*   (2006.01)
  *B01D 53/78*   (2006.01)
  *B01D 53/96*   (2006.01)
(52) U.S. Cl.
  CPC .............. *B01D 2252/20426* (2013.01); *B01D 2252/20484* (2013.01); *B01D 2252/20489* (2013.01); *B01D 2257/504* (2013.01)
(58) Field of Classification Search
  CPC ........... B01D 2252/20484; B01D 2252/20489; B01D 2257/504
  See application file for complete search history.

(56) References Cited

U.S. PATENT DOCUMENTS

| | | |
|---|---|---|
| 9,656,203 B2 | 5/2017 | Aichele et al. |
| 2006/0249020 A1* | 11/2006 | Tonkovich ............. B01D 53/04 95/115 |

\* cited by examiner

APPARATUS AND METHOD FOR CARBON DIOXIDE REMOVAL

CROSS-REFERENCE TO RELATED APPLICATIONS

This application claims priority to and the benefit of U.S. Provisional Application Ser. No. 62/690,075 filed on Jun. 26, 2018, the entire contents of which are hereby incorporated by reference.

ORIGIN OF THE INVENTION

The invention described herein was made by employee(s) of the United States Government and may be manufactured and used by or for the Government of the United States of America for governmental purposes without the payment of any royalties thereon or therefor.

FIELD OF INVENTION

The present invention relates to a new and improved system and method for separating one or more predetermined gases from an environment.

BACKGROUND

There is a need for gas phase separation apparatuses for closed environment applications. Specifically, the separation of carbon dioxide ($CO_2$) from air is such an application. In a closed environment, such as in a submarine or space vehicle, the need for ($CO_2$) removal is necessary to maintain a breathable atmosphere. The process for removing $CO_2$ is generally a cyclic sorption-desorption process between two environments. In an embodiment, $CO_2$ may be captured in a first environment on a first side by a medium (or sorbent) and transferred or exposed to a high temperature/low pressure side where the $CO_2$ may be released into a second environment.

The separation of $CO_2$ from air comprises two competing design parameters that generally have an inverse relationship: (1) containment of the adsorbing medium (or sorbent); and (2) kinetics of the separation process. The sorbent may be either a solid or a liquid solution. The sorbent may contact the $CO_2$ laden air, but the sorbent should be contained and prevented from entering the process air stream. Effective $CO_2$ removal systems may be "fast acting," with sufficiently fast uptake kinetics to meet $CO_2$ removal rate requirements with an acceptably small system size. As used herein, "fast acting" and "slow acting" relate to a predetermined volumetric rate such as grams of $CO_2$ uptake per cubic centimeters per minute for one or more predetermined environmental conditions. As an example, fast acting may be defined as about or greater than 0.5 grams (gms) of $CO_2$ uptake (per minute)(per square meter or liquid contact exposed to process air) for environmental conditions of 1 atmosphere (atm) total pressure, 20° C. temperature, 2.0 mmHg pp$CO_2$. As an example, slow acting may be defined as about or less than 0.3 gms of $CO_2$ uptake (per minute)(per square meter of liquid contact exposed to process air) for environmental conditions of 1 atm total pressure, 20° C. temperature, 2.0 mmHg pp$CO_2$.

In an embodiment, a $CO_2$ removal system may be comprised of multiple levels of containment—depending on the toxicity level of a liquid sorbent. A design embodiment may have a first level of containment, and multiple layers of "filters" as the second and third levels of containment. If the primary level of containment regularly releases liquid, and it impinges onto the first layer of filter, the system pressure drop may go up over time. A "well-contained" system at its first level of containment is generally defined herein to contain >99.9% of liquid sorbent per day—even in adverse conditions where process air velocities are 3 times nominal velocities and volumetric changes due to pump surges up to 3 times nominal.

Removing carbon dioxide ($CO_2$) from a spacecraft environment requires a robust system that is low in mass, power, and volume. As used herein, a "spacecraft environment" refers to outer space wherein "outer space" refers to an altitude greater than or equal to about 100 km as measured front Earth's sea level. Current state-of-the-art microgravity compatible $CO_2$ removal systems, such as the carbon dioxide removal assembly (CDRA) onboard the International Space Station (ISS), utilize solid sorbents, such as solid zeolite media, that demand high power usage due to high desorption temperatures and a large volume to accommodate their comparatively low capacity for $CO_2$. Additionally, solid sorbent systems contain several mechanical components that may significantly reduce reliability and contribute to a large overall mass. The CDRA is prone to dusting, requires high regeneration temperatures, frequent maintenance, and has a low fixed adsorption capacity. Comparably, liquid sorbents have a favorable capacity, approximately four times greater than current solid zeolites, low regeneration temperature, and require fewer unreliable mechanical parts than solid based systems. Additionally, systems based on a liquid sorbent for $CO_2$ removal are capable of lower power compared to solid systems.

However, the use of a liquid sorbent-based $CO_2$ removal system in outer space is challenging due to, among other things, controlling and balancing fluid flow associated with flow kinematics and liquid containment (at least partially due to evaporation of the working fluid), the complexity of direct air to liquid contacting (i.e., direct contact or directly contacting a liquid stream with a gaseous airflow or environment), the separation of gas and liquid phases, and the containment of liquids in a microgravity environment. A microgravity environment exists in outer space. Under microgravity conditions, free-floating liquids form a sphere in order to minimize surface energy in a favorable surface area to surface volume ratio. Typically, for fluid control reasons, contactors use hollow-fiber or flat plate membranes for absorbing $CO_2$ into a liquid stream. However, membranes suffer from slow mass transfer rates and fouling, making them undesirable for long-term missions. Comparably, contactors based on the principles of capillary physics do not suffer from the aforementioned issues. As used herein, "capillary physics" refers to the processes and phenomena associated with surface tension, surface energy, and/or solid surface geometry. As used herein, "capillary action" and "capillary fluid flow" refer to the ability to intentionally cause liquid to flow along surfaces without the assistance of and/or in opposition to external forces such as gravity. At the liquid/solid (surface) interface, capillary action may assist with flowing of the liquids in thin film configurations due to intermolecular attractive forces between a liquid and a solid surface. For example, when in contact with a solid surface with an indented geometry, it has been discovered that liquids adhere to the solid surface via surface tension and form a concave meniscus at the air to liquid interface to maintain surface energy minimization. Surface tension forces dominate at the boundary layer and prevent the liquid from shearing out of the capillary-based contactor elements. The insult is a relatively large surface area of direct gas (air) to liquid contact becomes achievable. In an embodiment, capillary-based contactor elements may comprise one or more microchannel contactors wherein several embodiments exist allowing for practical direct gas (air) to liquid contact in a microgravity environment. As used herein. "capillary-based" refers to an embodiment enabling capillary action. In another embodiment, capillary-based contactor elements may comprise adsorption or adsorber contactors and desorption or desorber contactors. Therefore, a liquid sorbent-based removal system and method for use in outer space may be designed in a manner where liquids capture and transport process fluids such as CO2.

There is a need for a liquid sorbent-based CO2 removal system for use in outer space. A system/apparatus and method for use that utilizes a contactor based on the principles of capillary physics may solve this need.

DESCRIPTION OF DRAWINGS

The invention will be apparent from a consideration of the subsequent detailed description presented in connecting with the accompanying drawings in which.

DETAILED DESCRIPTION

Figure 1:
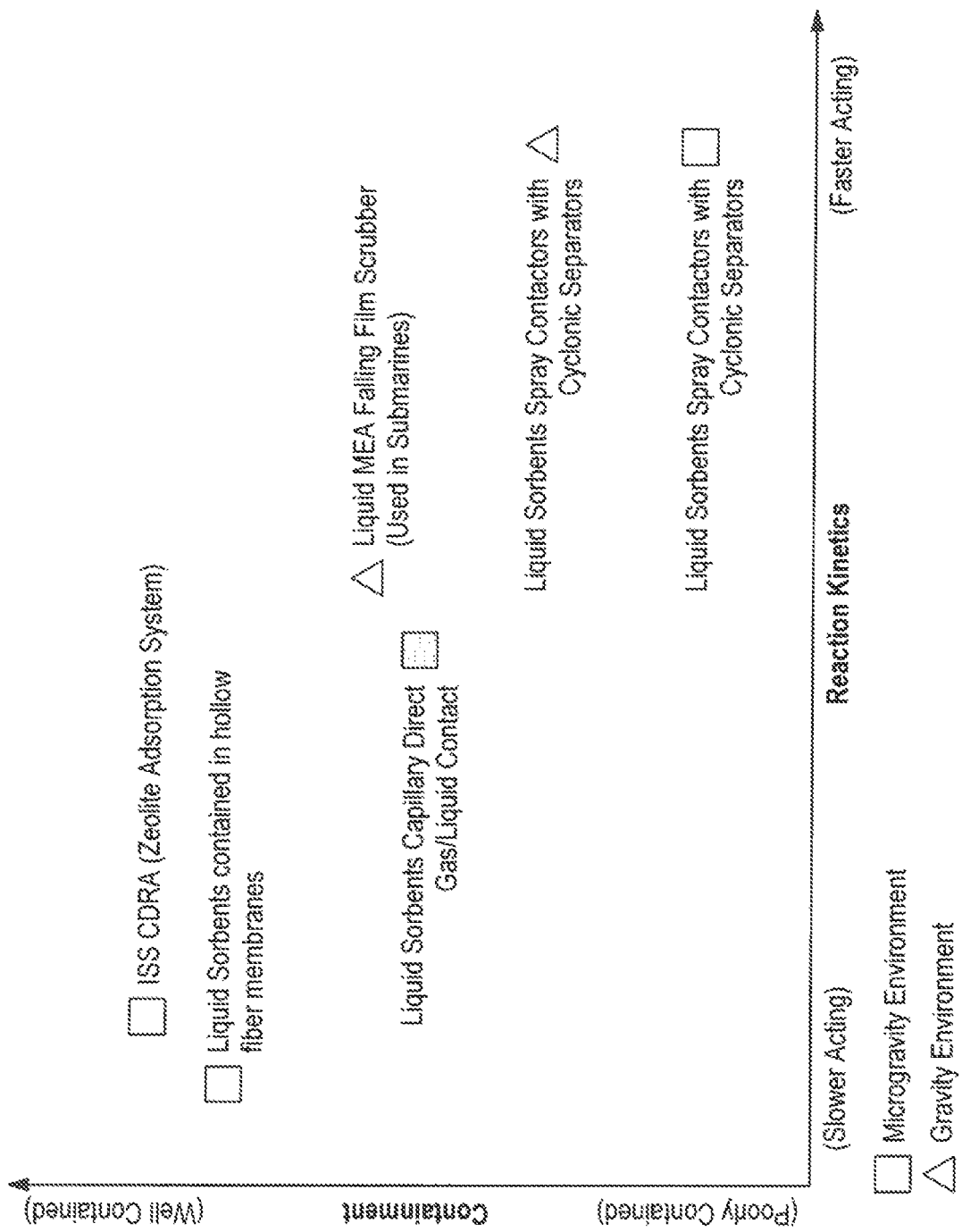
FIG. 1 is a conceptual graph illustrating a relationship between containment of an adsorbing medium and kinetics of a separation process for representative CO2 removal systems designed to operate in microgravity environments, such as outer space.

Kinetics and containment generally have an inverse relationship. Specifically, systems that are fast acting tend to be poorly contained, while systems that are well contained tend to be slow acting. Consider FIG. 1, which conceptually maps kinetics/containment attributes for representative CO2 removal systems that are designed to operate in microgravity environments, such as in outer space, as well as gravity environments. The ISS CDRA is a zeolite adsorption system is used in a microgravity environment. The ISS CDRA is well-contained because it employs a solid phase CO2 capture medium. But zeolites are relatively slow to heat and thermally regenerate, wherein the resultant system kinetics are slower acting. Immobilized "solid amine" systems are similarly well-contained because they are solid phase, but they are also slower acting because they are relatively slow to heat and thermally regenerate. Liquid sorbents that are contained within hollow fiber membranes are slower acting because the contact between the liquid sorbent and the gas phase CO2 is blocked and limited by the membrane. A spray contactor may use liquid sorbents sprayed into tiny droplets. In a gravity environment, the droplets settle at the bottom of the reactor and gravimetric methods of containment are effective. In contrast, in a microgravity environment, cyclonic separators are considered. But containment for cyclonic separators is generally never complete and liquid sorbent has the chance to enter the process air stream. For liquids sorbent-based CO2 removal systems, kinetics are relatively fast acting because small liquid droplets have significant surface area that is in direct contact with the gas phase CO2. But cyclonic separators are not 100% efficient at gas/liquid separation, so containment is relatively poor (i.e. poorly-contained). Currently there is no operational microgravity compatible CO2 removal system that is relatively fast acting (compared to a liquid monoethanolamine (MEA) falling film scrubber used in submarines) and well-contained (compared to submarine scrubbers). Due to containment concerns, the prior art does not put liquids in direct contact with gas in a microgravity environment.

A novel apparatus and method of CO2 removal that operates in a microgravity environment and puts liquids in direct contract with gas is described herein. The apparatus and method may be fast acting (compared to zeolite systems or liquid amine membrane systems) and may be relatively contained (compared to liquid sorbent spray or cyclone separation systems). An embodiment of such an apparatus may have one or more of the following six (6) characteristics:

1. The apparatus may comprise a liquid CO2 sorbent (aka liquid sorbent). Liquid sorbents include, but are not limited to: MEA. MEA with additives to limit oxidation, MEA with additives to reduce vapor pressure, MEA with additives to increase reaction kinetics, diethanolamine (DEA), DEA with additives to limit oxidation, DEA with additives to reduce vapor pressure, DEA with additives to increase reaction kinetics, diglycolamide (DGA), DGA with additives to limit oxidation, GA with additives to reduce vapor pressure. DGA with additives to increase reaction kinetics, and ionic liquids. Several liquid CO2 sorbents are known in the art as having a high capacity for CO2, are fast acting, regenerate at relatively low temperatures, have sufficiently low vapor pressures, and are sufficiently non-toxic to use in a spacecraft environment (provided proper containment controls are in place). Many liquid sorbents have an affinity for water (H2O) as well as CO2, so the sorbent/water ratio may be deliberately managed. Some liquid sorbents are caustic and corrosive, so the materials in contact with the liquid sorbent need to be compatible with the liquid. Liquid viscosity changes as a function of temperature, sorbent/water ratio, and CO2 loading. Viscosity affects the nature of capillary fluid flow, so capillary-based designs need to allow for changes in viscosity. The wetting angle between liquid sorbents and solid materials affect the nature of capillary fluid flow, so capillary-based designs need to consider wetting angle and changes in wetting angle.

2. The apparatus may comprise direct contact between the liquid CO2 sorbent and a gas phase process stream or a predetermined environment comprising one or more gases. In this embodiment, there may be no physical barriers such as gas permeable membranes for liquid containment.

3. The liquid CO2 sorbent may adhere to a solid surface. In this embodiment, liquid CO2 sorbents are not "free floating" in the process air stream as they are in spray contact systems.

4. The liquid CO2 sorbent may be pumped in a recirculating or circulating loop (or one or more fluid loops) capable of fluid flow. In an embodiment, one or mom recirculating loops may enable the liquid to occupy an environment with low temperature conditions that are favorable to CO2 uptake, then move or flow to an environment with high temperature conditions (or low pressure conditions) (or an environment with a combination of high temperature and low pressure). The one or more recirculating loops may comprise one or more pipes comprising a plurality of pipe sections. In this embodiment, because the liquid CO2 sorbent may be actively recirculated in a loop, the energy needed to heat the liquid CO2 sorbent may be relatively low. In a loop system embodiment, the CO2 sorbent may be heated. In a stationary, fixed bed system embodiment, the sorbent medium and the bed structure may be heated. In a loop system embodiment, the air circulation path may be fixed and no air selector valves would be needed. In a stationary, fixed bed system embodiment, air flow paths alternate and a system of air selector valves may be required.

5. The apparatus may comprise an intentional flow distribution system to enable efficient loop circulation and disperse spreading of liquid CO2 sorbent thin films across a large surface area.

6. The apparatus may employ capillary action to enable the liquid CO2 sorbent to move or flow in the adsorption and desorption areas of the system. Movement of the liquid CO2 sorbent (aka fluid movement) in the recirculating or circulating loop parts of the system may use a means for creating a pressure difference such as a pump, or fluid movement may be caused by pressure differences between different locations in the apparatus (such as for example, locations in different pipe sections). In direct contrast, the pressure in the CO2 adsorption part (or adsorber section) of the system may be uniform—the entire CO2 adsorber section of the system may be open to cabin air, the entire CO2 adsorber section of the system may be at ambient cabin pressure, and liquid CO2 sorbents may not be able to move from adsorption inlet to the adsorption exit by pressure difference. Stated otherwise, in this embodiment, flow within the adsorber section is not achieved by a means for creating a pressure difference such as a pump. Instead, the liquid CO2 sorbent may move in the adsorber section of the system due to a capillary gradient. As used herein, a "capillary gradient" refers to a change in the value of capillary pressure between one location and another. Multiple configurations will be described herein to effectively move liquid CO2 sorbent from adsorption inlet to the adsorption exit. Each of these configurations may use capillary action, and each of these configurations may take into account the fluid physical and chemical properties. The desorber section of the apparatus may be an enclosed environment with a fixed pressure. Liquid sorbents may not move in the desorber section due to a pressure difference. Instead, a fluid (such as a liquid sorbent) may move or flow in the desorption section due to a capillary gradient. Multiple configurations and embodiments to move or flow liquid sorbent from the desorption inlet to the desorption exit will be described herein. Each of these configurations may use capillary action, and each of these configurations may take into account the fluid physical and chemical properties and changes thereto.

Figure 2:
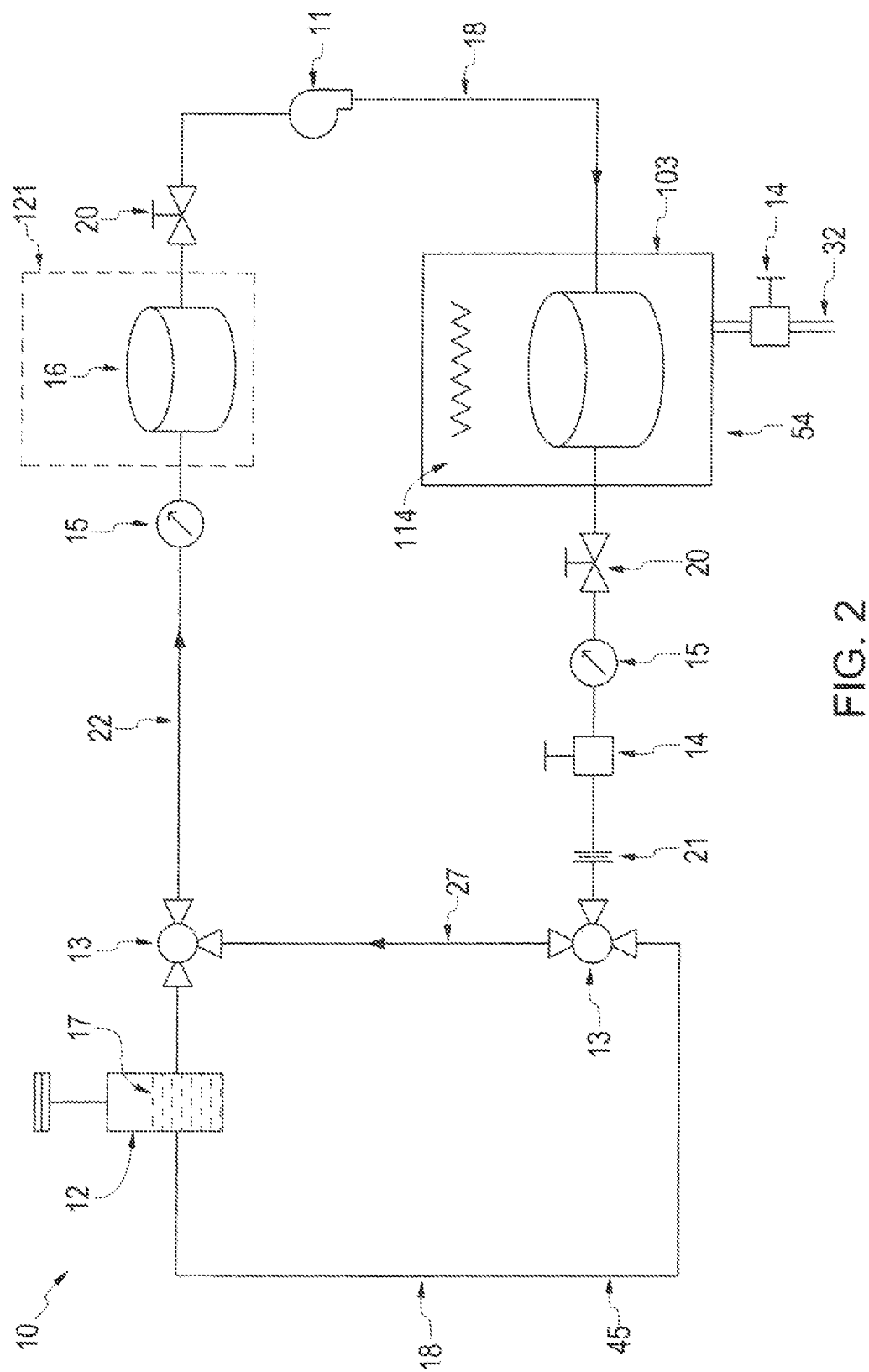
FIG. 2 is a system view of an embodiment of a liquid sorbent-based CO2 removal system.

With particular emphasis on FIG. 2, a system view of an embodiment of a liquid sorbent-based CO2 removal apparatus (10) is illustrated. The apparatus (10) may comprise a pump (11), a container (12) containing a predetermined liquid (17), one or more valves (13), a pressure regulator (14), a gauge (15), an adsorber and desorber section (16, 54), and one or more means for conveying fluids (18). A pump (11) may be capable of continuously recirculating the predetermined liquid (17) from the container (12) through the one or more means for conveying fluids (18) in a closed loop (22), except for and not in the adsorber and desorber sections (16,54). Generally, a difference in pressure may provide a means for circulating the predetermined liquid (17) in the one or means for conveying fluids (18). In an embodiment, the predetermined liquid (17) may be a predetermined liquid sorbent. In an embodiment, a predetermined liquid sorbent may include ionic liquids or liquid amines. In an embodiment, a liquid amine may be comprised of diglycolamine, monoethanolamine, etc. In an embodiment, the means for conveying fluids may be comprised of one or more pipes, tubes, etc. In an embodiment, a means for creating a pressure difference may be the pump (11) which may be a rotary pump, cavity pump, piston pump, gear pump, etc. In an embodiment, the valves (13) may be comprised of gate valves, ball valves, diaphragm valves, check valves, etc. The valves (13) may be electromechanically operated such as, e.g., a solenoid valve (13) or manually operated such as, e.g., by means of a handle (20). In an embodiment, the one or more valves (13) may be used in the apparatus (10) to perform functions such as, e.g., purging the apparatus (10) of air bubbles or closing off portions of the apparatus (10) from fluid flow. In an embodiment the apparatus (10) may be further comprised of an orifice (21) wherein the orifice (21) may be capable of providing flow resistance within the apparatus's closed loop (22). In an embodiment, the gauge (15) may be capable of monitoring the pressure within the closed loop (22) of the apparatus (10) during operation. In an embodiment, the pressure regulator (14) may be capable of delivering a fluid flow at a predetermined pressure to the adsorber and/or desorber sections (16, 54). In an embodiment, the desorber section (54) may be comprised of an enclosure (103). Desorbed CO2 may be delivered through a product port (32). The apparatus (10) may be further comprised of a frame structure as well as one or more accelerometers, pump controllers, timers, switch panels, instrumentation panels, processors, power units, transmitters, valve controllers, cameras, receivers, blowers, filters, air intakes, heaters (114), air vents, or any combination.

One of the attributes of what is described herein is the liquid sorbents may be circulated through a looped system for effective CO2 uptake and for effective CO2 desorption and chemical regeneration. CO2 uptake is effective if the liquid sorbent is directly exposed to CO2 laden air. CO2 uptake may occur under cabin pressure conditions. The circulation rate may be adjusted so the liquid sorbent contact times in the adsorption section approximately match uptake kinetics of the liquid sorbent. CO2 regeneration may occur when the liquid sorbent is heated to predetermined elevated temperature conditions. The desorption pressure may be slightly above or below cabin pressure conditions—depending on the design priorities of the system. Desorption may occur quicker at reduced pressure conditions, but systems with low pressure desorption may require two or more pumps.

Figure 3:
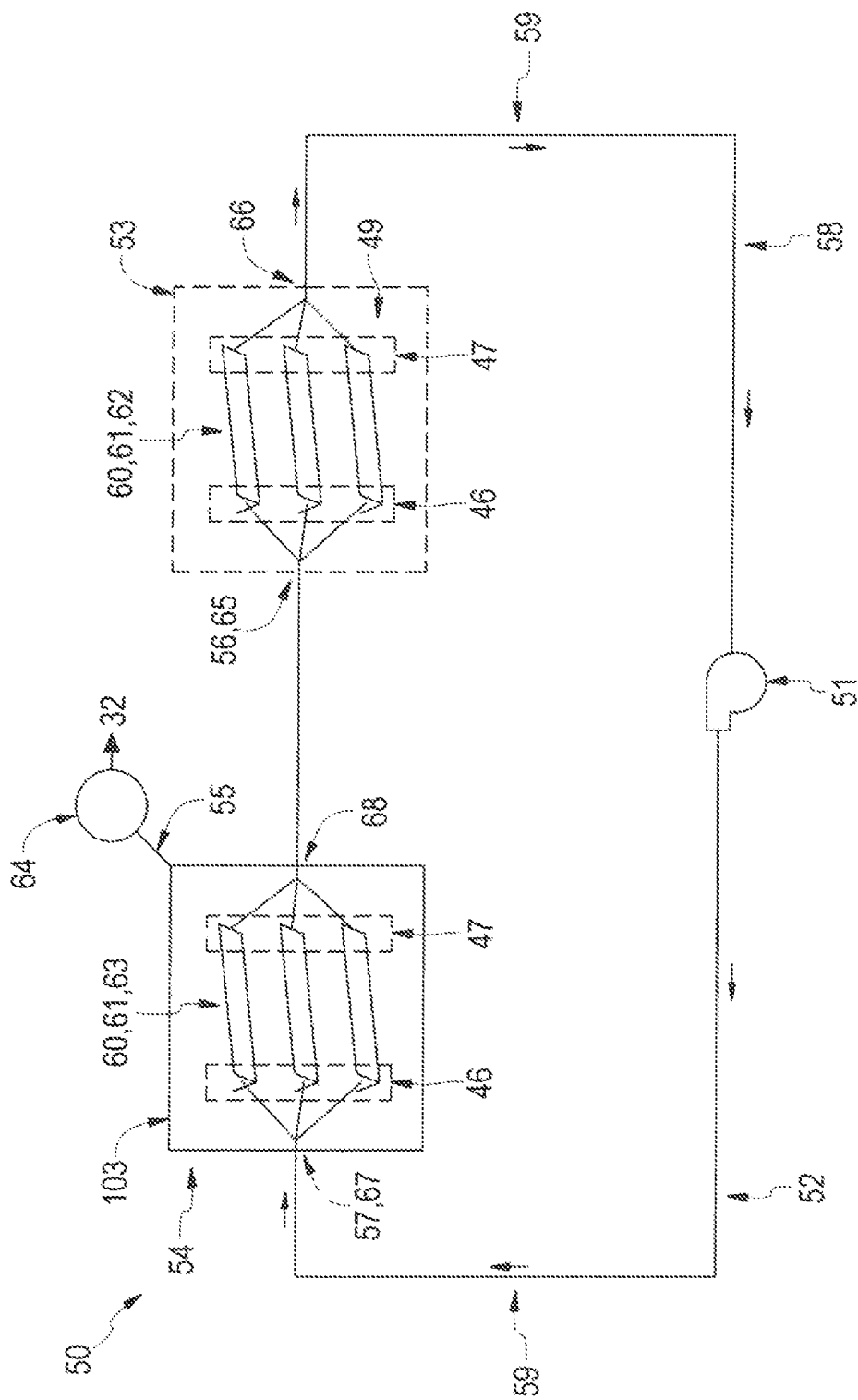
FIG. 3 illustrates a single loop, single pump liquid sorbent-based CO2 removal system.
Figure 4:
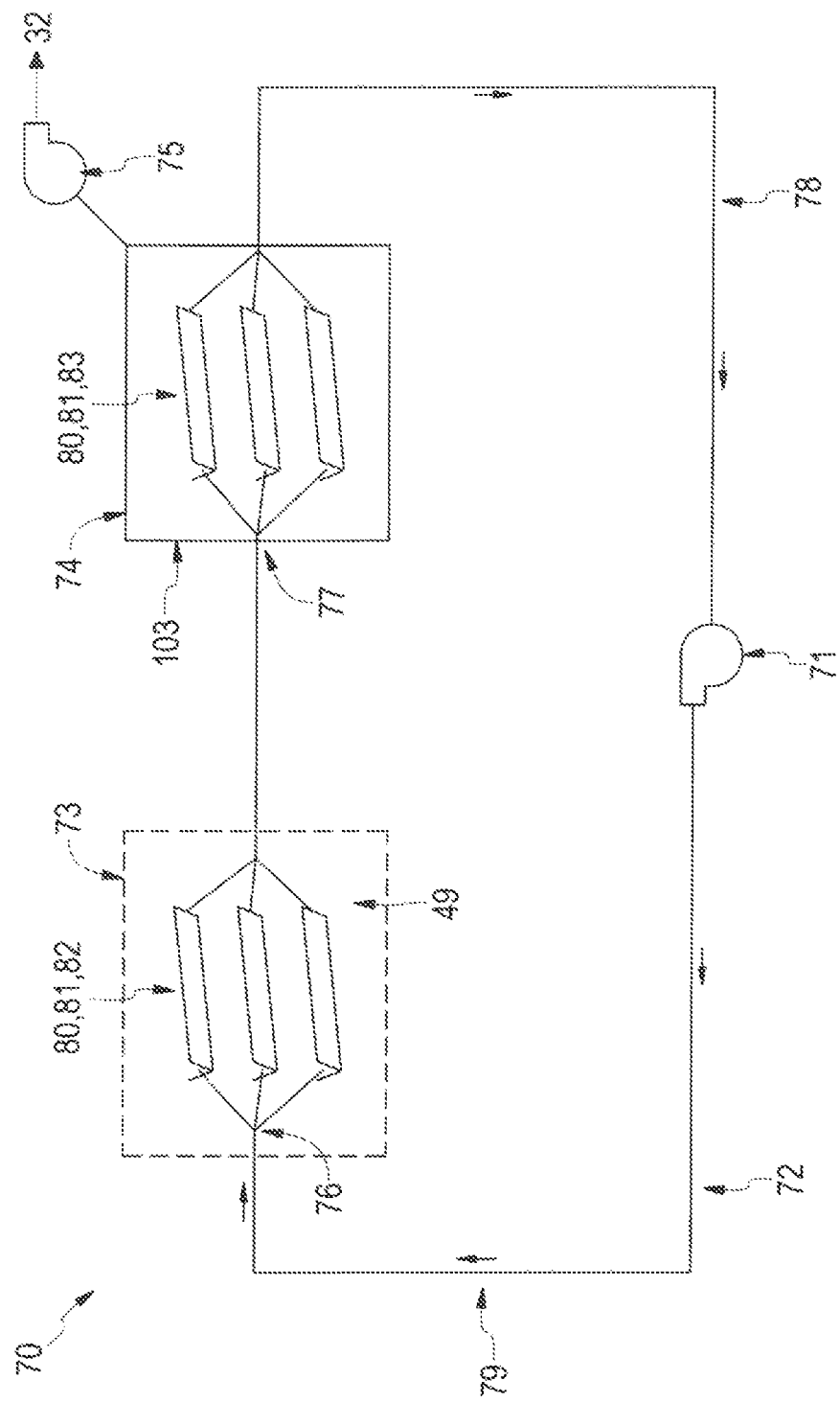
FIG. 4 illustrates a single loop, single pump liquid sorbent-based CO2 removal system with a desorption system that uses both elevated temperature and reduced pressure.
Figure 5:
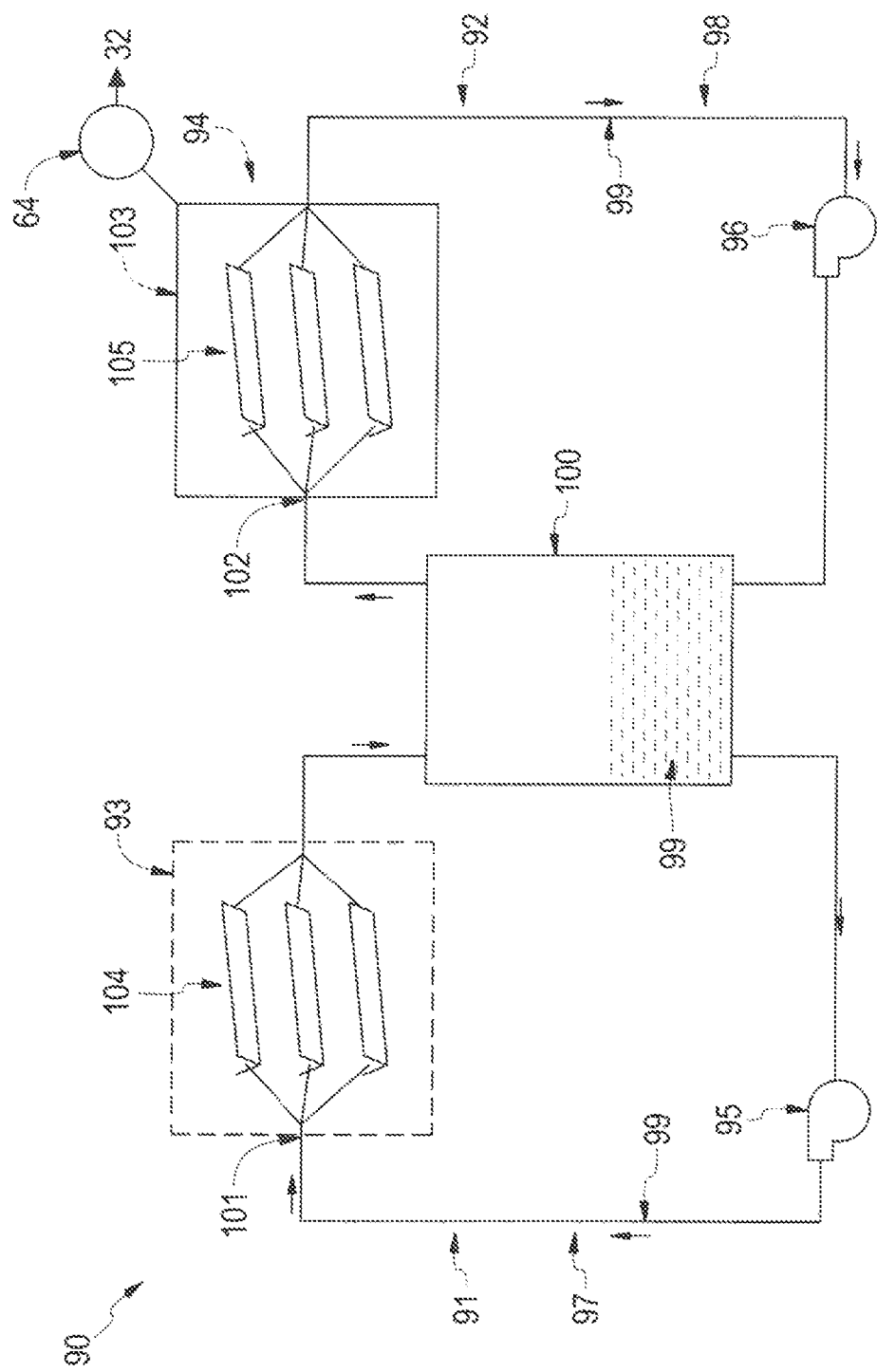
FIG. 5 illustrates a two loop, two pump liquid sorbent-based CO2 removal system capable of direct air to liquid contact under microgravity conditions.

FIGS. 3 through 5 describe three types of recirculation or circulation loops. FIG. 3 illustrates a single loop, single pump system (50). A single pump (51) circulates a predetermined liquid (59) in a recirculating loop (52); except for an adsorption section (53) and a desorption section (54). The recirculating loop (52) may be comprised of one or more pipes (58). The predetermined liquid (59) may be contained in the one or more pipes (58) with fluid flow driven by commonly-known pressure difference methods in predetermined areas of the recirculating loop (52), except for and not in the adsorption and desorption sections (53, 54). As will be described below, in an embodiment, fluid flow in the adsorption and desorption sections (53, 54) results from capillary action created by a capillary gradient and not as a result of a pressure difference (e.g., such as a pressure difference created by the pump (51)). The system (50) may have two unique breaks: the adsorption section (53) and the desorption section (54). In these two sections, the predetermined liquid (59) exits a first and second predetermined location (56, 57) from the one or more pipes (58), and may be spread as a thin film attached to a solid surface (60). In an embodiment, the first exit (56) corresponds to a first inlet (65) or adsorption inlet (65) into the adsorption section (53). In an embodiment, the thin film attached to the solid surface (60) may be a result of surface tension. The solid surface (60) may be comprised of one or more contactor elements (61). The one or more contactor elements (61) may comprise one or more adsorption contactor elements (62) in the adsorption section (53). Similarly, the one or more contactor elements (61) may comprise one or more desorption contactor elements (63) in the desorption section (54). A first pressure in the adsorption section (53) and a second pressure in the desorption section (54) are generally uniform wherein the predetermined liquid (59) does not move or flow in these sections due to a pressure difference. Rather, in the adsorption and desorption sections (53, 54), the predetermined liquid (59) may move or flow due to a capillary action, wherein such capillary action may be the result of a predetermined capillary gradient. Flow controlling elements at the inlet of the contactor (46) and at the outlet of the contactor (47) may evenly distribute the flow, which is delivered to the adsorption section outlet (66) and the desorption section outlet (68). In an embodiment, the capillary gradient may be a result of a predetermined contactor element (61) design. The system (50) may be comprised of a pressure regulator (62). The desorption section (54) may be comprised of an enclosure (103) capable of creating a closed volume and capturing liquid and gas inside the desorption section (54). Gaseous CO2 and water vapor may leave the system (50) through one or more conduits (55) regulated by the pressure regulator (64) to a CO2 exit port (32)—at a third predetermined pressure of the pressure regulator set point. In contrast to the desorption section's (54) closed volume, the adsorption section (53) may be open to a predetermined environment (49). In an embodiment, the predetermined environment may be spacecraft environment. In an embodiment, the predetermined environment may be a passenger or cargo compartment of a space vehicle (aka, a cabin of a space vehicle) operating in outer space. In an embodiment, it is at cabin atmospheric pressure when cabin air may freely move across the predetermined liquid's surface. In the system (50), the second pressure may be higher than cabin atmospheric pressure.

FIG. 4 illustrates a single loop, dual pump system (70). The system (70) may use a recirculating loop (72) comprised of one or more pipes (78) and containing a predetermined liquid (79). The predetermined liquid (79) moves or flows in the one or more pipes (78) by a means for creating a pressure difference. In an embodiment, a means for creating a pressure difference may be comprised of a single pump (71), which provides a pressure difference to circulate the predetermined liquid (79) in the recirculating loop (72); except for and not in an adsorption section (73) and a desorption section (74). In these two sections, the predetermined liquid (79) exits a first and second predetermined location (76, 77) in the one or more pipes (78), and may be spread as a thin film attached to a solid surface (80). The solid surface (80) may be comprised of one or more contactor elements (81). In the adsorption section (73), the one or more contactor elements (81) may comprise one or more adsorption contactor elements (82). Similarly, in the desorption section (74), the one or more contactor elements (81) may comprise one or more desorption contactor elements (83). In an embodiment, the adsorption section (73) may be open to a first environment (49). In an embodiment, the first environment may be a cabin environment comprising cabin atmospheric pressure. In an embodiment, the cabin environment may be a space vehicle cabin environment wherein the space vehicle may be operating in outer space. The adsorption section (73) may be at cabin atmospheric pressure, and cabin air may freely move across the predetermined liquid's surface in the adsorption section (73). Comparably, the desorption section (74) may be comprised of an enclosure (103) wherein the enclosure (103) may be capable of maintaining a closed volume and a second environment. The closed volume may be capable of capturing one or more gases and/or water. Unlike the system (50) in FIG. 3, this system (70) may be comprised of a desorption section (74) maintained at one or more predetermined sub-ambient pressures. Sub-ambient pressure improves desorption kinetics. A pressure in the desorption section (74) may be maintained by a desorption pump (75) and enclosure (103). This desorption pump (75) may remove gaseous CO2 from the system (70), and may deliver pressurized gaseous CO2 to other systems (32) for oxygen recovery or other applications.

FIG. 5 illustrates a dual loop, dual pump system (90). A single pump system may restrict the amount of control for fluid flow in a means for conveying a predetermined liquid. The fluid flow rate that supplies an adsorption section and the fluid flow rate that supplies a desorption section should be the same in a single pump system. Comparably, in a dual loop system, the fluid flow rate supplying the adsorption and desorption sections may be different. The system (90) may be comprised of a first loop (91) and a second loop (92). The first loop (91) may comprise an adsorption section (93), a first pump (95), and a first set of one or more pipes (97). The first set of one or more pipes (97) may contain a predetermined liquid (99). The predetermined liquid (99) may exit a first predetermined location (101) in the first one or more pipes (97) thereby entering the adsorption section (93) wherein the predetermined liquid (99) may leave the predetermined location (101) and spread as a thin film attached to a first solid surface (104). The first solid surface (104) may be comprised of a first one or more contactor elements. The first one or more contactor elements in the adsorption section (93) may comprise one or more adsorption contactor elements. The second loop (92) may comprise a desorption section (94), a second pump (96), and a second set of one or more pipes (98). The second set of one or more pipes (98) may contain the predetermined liquid (99). The predetermined liquid (99) may exit a second predetermined location (102) in the second one or more pipes (98) thereby entering the desorption section (94), wherein the predetermined liquid (99) may leave the predetermined location (102) and spread as a thin film attached to a second solid surface (105). The second solid surface (105) may be comprised of a second one or more contactor elements. The second one or more contactor elements in the desorption section (94) may comprise one or more desorption contactor elements. Desorbed water vapor and CO2 may leave the system through a product delivery port (32) with a delivery pressure controlled by a pressure regulator (64). In an embodiment, the pressure in the adsorption section (93) may be cabin ambient pressure, so cabin air may freely move across the first predetermined liquid's surface. In an embodiment, the adsorption section (93) operates in a first environment wherein the first environment may be comprised of a cabin environment. In another embodiment, the cabin environment may be comprised of a microgravity environment. In an embodiment, the pressure in the desorption section (94) may be above or below cabin pressure. In an embodiment, the desorption section (94) operates in a second environment not comprised of a cabin environment. In an embodiment, the second environment may be comprised of a microgravity environment. An accumulator tank (100) capable of accommodating changes in the total volume of the predetermined liquid (99) may provide a shared source of the predetermined liquid (99) for the first and second loops (91, 92). In an embodiment, heat exchangers or other temperature management devices (not shown for reasons of clarity) may be included in any of these three configurations, to reduce the energy use for heating.

Figure 6:
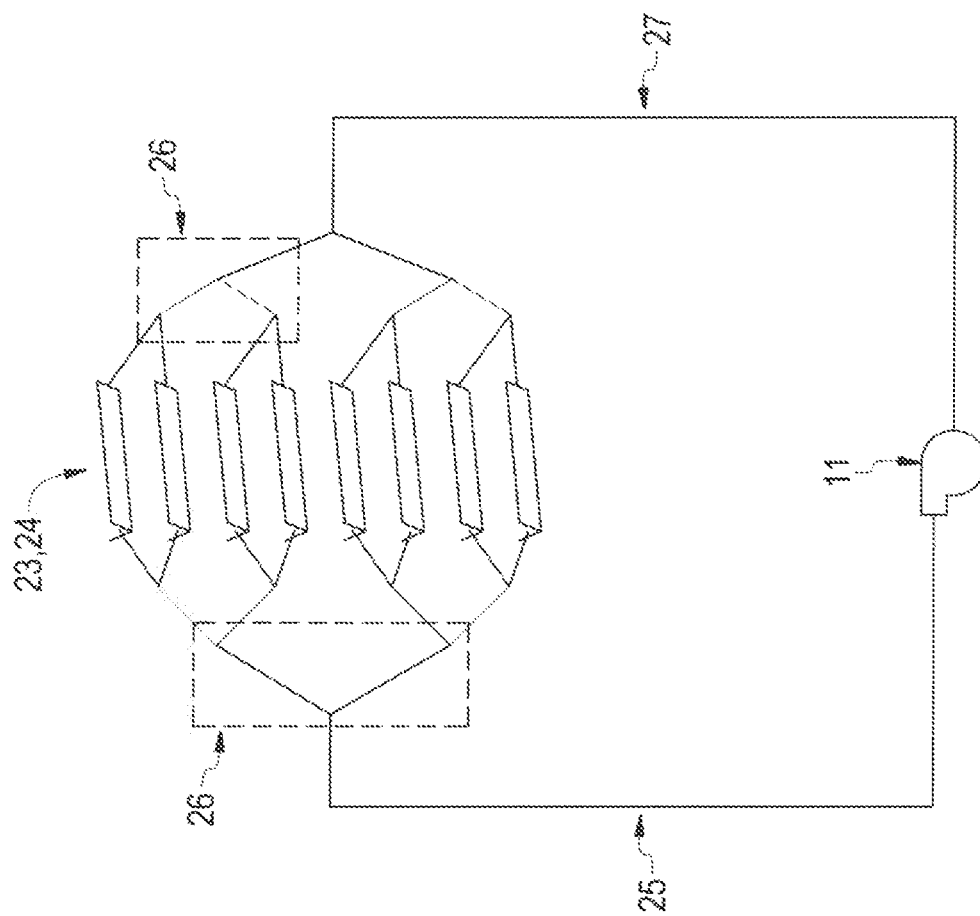
FIG. 6 describes an embodiment of a multi-stage branching manifold method of flow distribution capable of direct air to liquid contact under microgravity conditions.

With a general reference to FIG. 6, an efficient, compact apparatus and method of CO2 removal based on a liquid-sorbent with fast kinetics may have one or more relatively small, compact recirculation loops (27) and a relatively abrupt transition from one or more pipes (25) to one or more of contactor elements (23) with a predetermined amount of total exposed surface area (24). System level CO2 uptake requirements may drive the objective for a predetermined amount of total exposed surface area (24) which would have a direct effect on the total amount of liquid/air contact area. Capillary gradient limitations may drive the objective for an embodiment of a contactor element (23 peach with a relatively small amount of surface area. A fluid distribution system that may efficiently deliver fluid from one or more pipes (25) to multiple contactor elements (23) relates to system performance.

Generally, the transition between the one or more pipes (25) and one or more contactor elements (23) may be abrupt for purposes of system compactness. In an embodiment, to achieve uniform flow distribution across a range of fluid conditions, the fluid distribution may have a predetermined design. The following describes five different distribution methods that may be used in a "capillary action"-driven direct contact gas/liquid recirculation loop:

Sequential flow bifurcation
Multi-axis flow bifurcation
Radial bifurcation
Pressure drop centralization
Manifolded flow balancing Flow splitting into three or more branches may result in uneven flow distribution, but flow bifurcation is substantially more stable than ≥3 branching—especially when each leg of the branch has about >50% of the cross sectional area of the original branch and when the angle of bifurcation is less than about 60 degrees. In other words, use of one or more bifurcating manifolds aids in balancing fluid flow, even when fluid flow or flow velocity is relatively high and residence times are relatively short. In an embodiment, one pipe may feed 4 or more contactor elements with uniform flow distribution, even at pumping speeds approximately >400 times faster than those projected for CO2 removal applications. In another embodiment, flow splitting may be accomplished in a sequential, multi-tiered, bifurcating manner.

FIG. 6 illustrates a sequential, three-tiered, bifurcating flow splitting or flow distribution configuration. In this embodiment, a recirculation loop (27) may be comprised of multiple bifurcating manifolds (26) configured in a sequential, three-tiered manner. The recirculation loop (27) may be further comprised of eight contactor elements (23) and a pump (11). In yet another embodiment (not illustrated), flow splitting may be accomplished along two alternating axes, wherein a multi-axis flow bifurcation splitting technique may be employed. Specifically, a sequential, four tiered multi-axis flow bifurcating splitting technique may comprise bifurcating flow splits along the Y axis in tiers 1 and 3, and bifurcating flow splits along the Z axis in tiers 2 and 4. This flow splitting approach is spatially efficient, and when a bifurcating manifold is manufactured using additive manufacturing processes, the cross sectional area of the manifold system may change smoothly and continuously.

Figure 7:
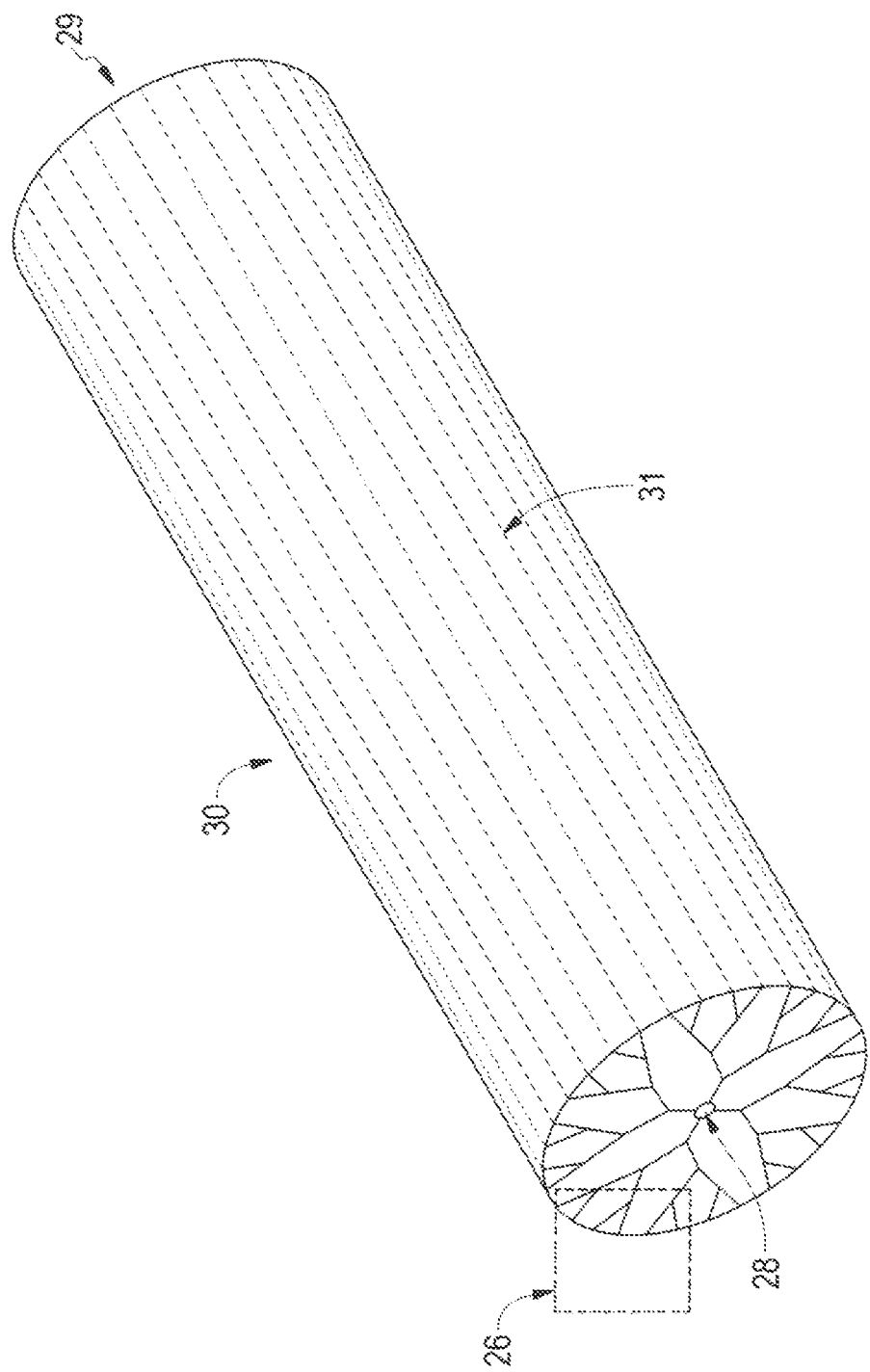
FIG. 7 describes an embodiment of a radial multi-stage branching manifold method of flow distribution capable of direct air to liquid contact under microgravity conditions.

With particular attention to FIG. 7, in another embodiment, fluid supply and fluid return lines (28, 29) may be configured along the central axis of a cylindrical structure (30) in a substantially coaxial manner. The fluid supply line (28) may sequentially bifurcate utilizing one or more bifurcating manifolds (26) that extend radially from the fluid supply line (28) to one or more contact surfaces (31) located in proximate relationship to the cylindrical structure's outer surface.

Figure 8:
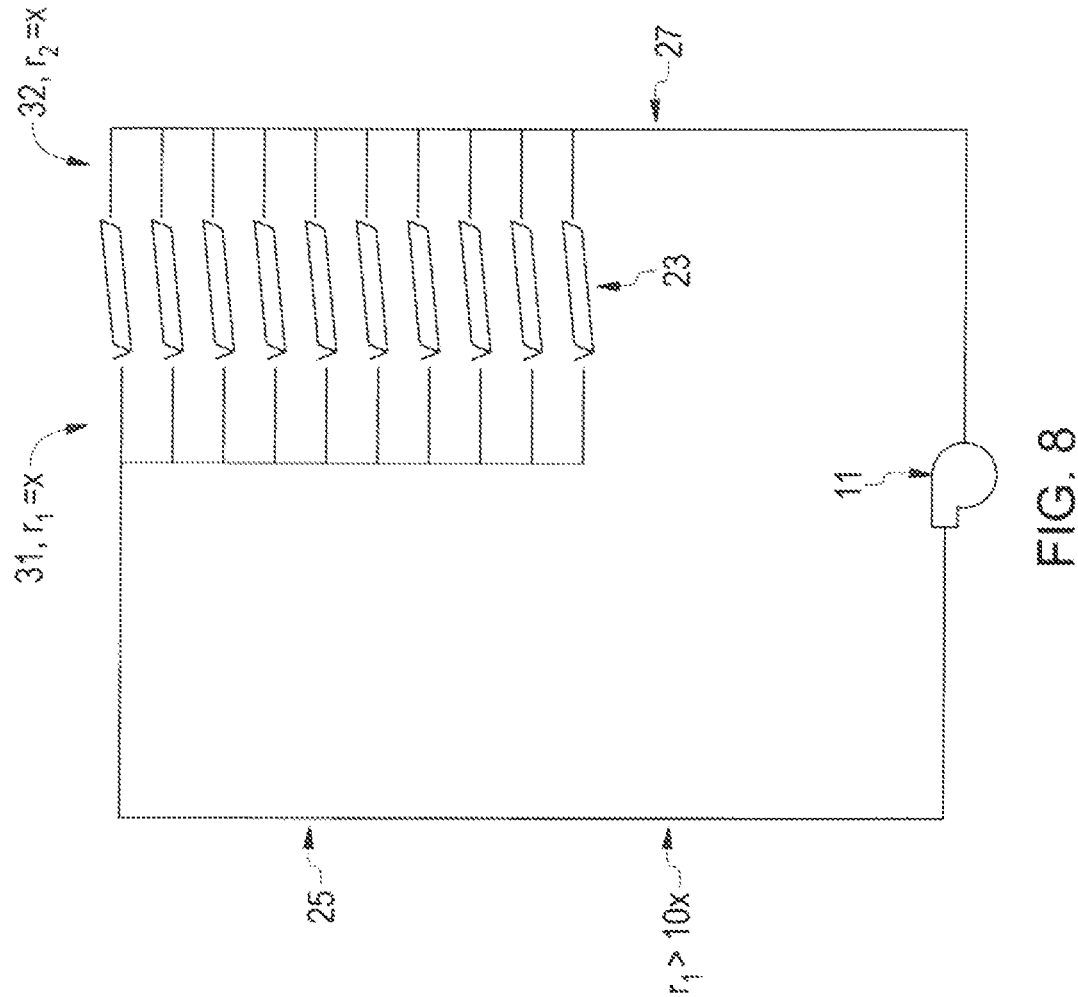
FIG. 8 describes an embodiment of a pressure drop centralization method of flow distribution capable of direct air to liquid contact under microgravity conditions.

FIG. 8 illustrates a recirculation loop (27) comprised of a pressure drop centralization configuration. In this embodiment, the recirculation loop (27) may be comprised of one or more pipes (25), one or more entrance ports (31), one or more exit ports (32), one or more contactor elements (23), and a pump (11). The recirculation loop's fluid flow may be balanced by having one or more entrance and exit ports (31, 32) wherein each of said ports' radius ($r_1$, $r_2$) may be a predetermined first length. Comparably, the associated radius ($r_3$) of the one or more pipes (25) may be greater than or equal to about 10 times the entrance and exit ports' radius (or $r_3 \geq 10 \times r_1$, $r_3 \geq 10 \times r_2$). Pressure drop centralization as a method of flow distribution has been determined to be effective, even for flow velocities >70 times greater than those designed for a CO2 removal application. A consideration for pressure drop centralization is to design a recirculation loop where the dominant sources of system pressure drop are distributed, and are the same for each conductor element—and the pressure drop in other parts of the system are negligibly small compared to the distributed pressure drop at the conductor elements. In yet another embodiment, for purposes of increased efficient packaging, with even smaller circulating loop sizes, the pressure drop centralization method may be modified into a hybrid system where some of the flow balancing may be achieved by pressure drop centralization, and some of the flow balancing may be achieved by intentionally adjusting the size of the inlet and exit pipes to balance the system. This approach may require that fluid systems maintain a narrower range of viscosity than pressure drop centralization systems, but "manifolded" flow balancing systems may be smaller, more tightly packaged, and use smaller recirculating pipes.

Direct gas contact of a predetermined liquid may occur at one or more adsorption contactor elements (aka adsorber contactor elements). In an embodiment, an adsorption section may comprise one or more adsorption contactor elements. Functional considerations for an adsorption contactor element may include:

- Containment of the operable fluid (e.g., liquid, liquid sorbent, liquid CO2 sorbent) so that it adheres to the solid surface, even in the presence of fast flowing air,
- Presenting the fluid directly to the air (i.e., direct contact between an operable or predetermined liquid and a gaseous environment such as cabin air) in the form of a thin film, so a large portion of the liquid may be at or near the contact surface;
- Moving the fluid from the inlet port to the exit port using capillary action;
- Matching the fluid residence time to the duration of time needed to sufficiently react and adsorb an effective amount of CO2 into the liquid sorbent;
- Operational reliability across a range of fluid conditions and environmental conditions;
- Use of materials with predetermined wettability properties so that predetermined solid surface geometries result in predetermined capillary fluid flow; or
- Use of materials that satisfy material compatibility and corrosion requirements.

Figure 9:
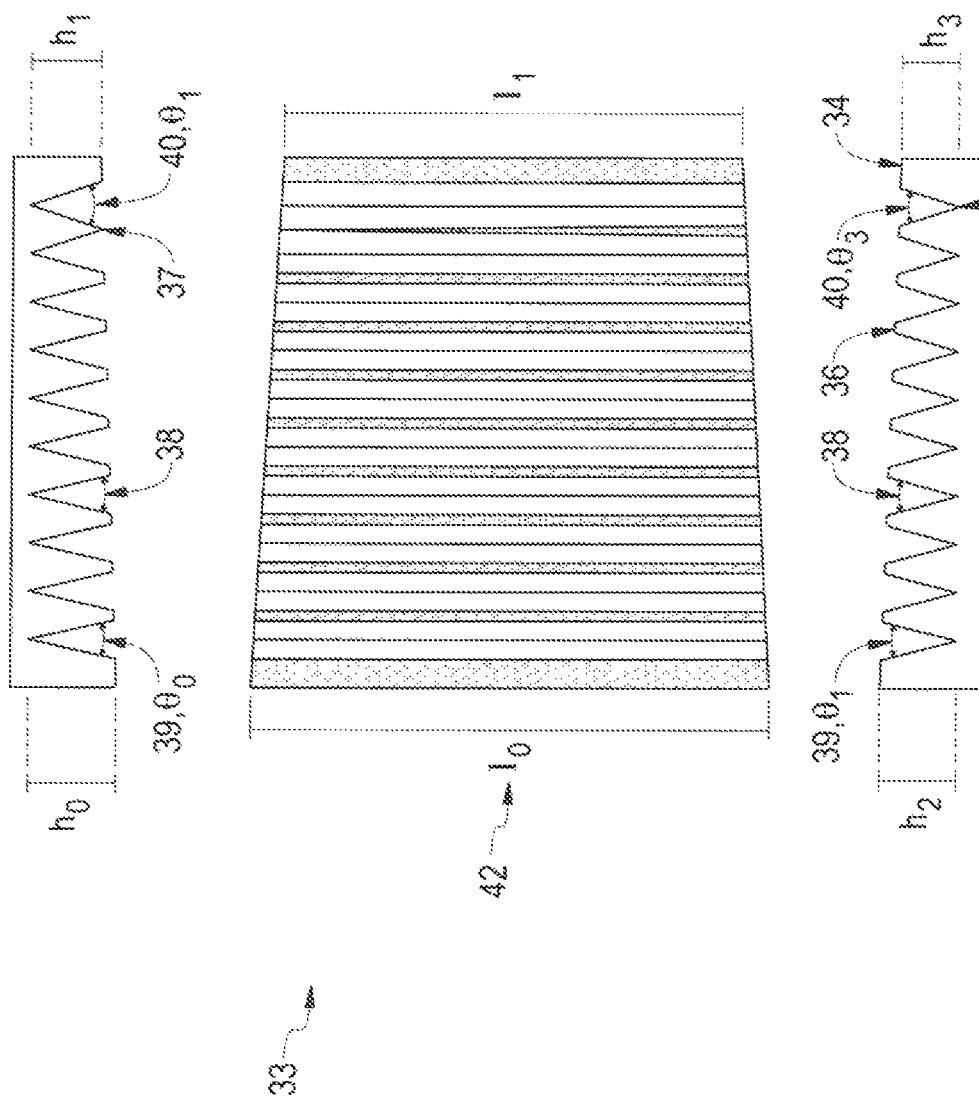
FIG. 9 is a perspective, cut-away view of a microchannel contactor with fluid on one planar surface of the contactor.

Multiple embodiments exist for satisfying one or more of the above functional considerations. Four different examples of adsorption contactor elements are described and compared in the following section:

Planar array.
Two surface planar array.
Variable angle planar array, and
Radial contactor The planar array adsorption contactor was successfully demonstrated in National Aeronautics and Space Administration (NASA) conducted tests in a microgravity environment using two different non-toxic aqueous fluids and fluid flow rates that were more than 100 times faster than the rates for current CO2 adsorption systems. Geometry and material selection may be designed to accommodate a liquid sorbent's chemical and physical properties. An embodiment of a planar array adsorption contactor is shown in FIG. 9. This planar array adsorber contactor (33) may be configured in a manner that allows it to operate in microgravity and gravity environments. For example, in a microgravity environment, a corrugated configuration comprising a plurality of alternating ridges (34) and grooves (35) may be used. The plurality of ridges (34) may comprise a flat top (36) of predetermined width or range of widths (i.e., a variable width) or a pointed top (37). The grooves (35) may comprise a predetermined one or more range of capillary wedge angles (38) such as, for example, a first range of capillary wedge angles (39) including $\theta_0$, $\theta_2$ and a second range of angles (40) including $\theta_1$, $\theta_3$. As used herein, a "contact angle" refers to the measured angle of the interface between a liquid droplet and a solid surface. As used herein, "capillary wedge angle" refers to the geometry of a groove in a solid material designed to influence capillary flow. A planar array contactor (33) may comprise a set of design parameters such as, for example: one or more heights or range of heights (41) for each ridge (34); one or more contact angles or range of contact angles (39) associated with each groove (35); and one or more lengths (42) or range of lengths (42) for each ridge (34) and groove (35). As a predetermined liquid such as a liquid sorbent flows through such planar array adsorption contactor (33), a predetermined liquid (17) may become a thin film of predetermined film thickness. A desired film thickness may help determine a contactor's design parameters. In an embodiment, for a system using DGA as the predetermined liquid, operating at a predetermined pressure such as 1 atm total pressure, predetermined temperature such as 20° C. temperature, and predetermined ppCO2 such as 2 mmHg ppCO2:

- Film thickness target range may be between about 1-5 mm;
- Corresponding range of heights for a first range of heights (43) including $h_0$, $h_2$ and a second range of heights (44) including $h_1$, $h_3$ may be between about 2-20 mm;
- Range of first and second capillary wedge angles (39, 40) may be between about 10-45 degrees;
- Range of lengths (42) including $l_0$, $l_1$ may be between about 2-20 cm; and
- Acceptable materials of construction for the contactor may include: acrylic, glass, and stainless steel.

Figure 10:
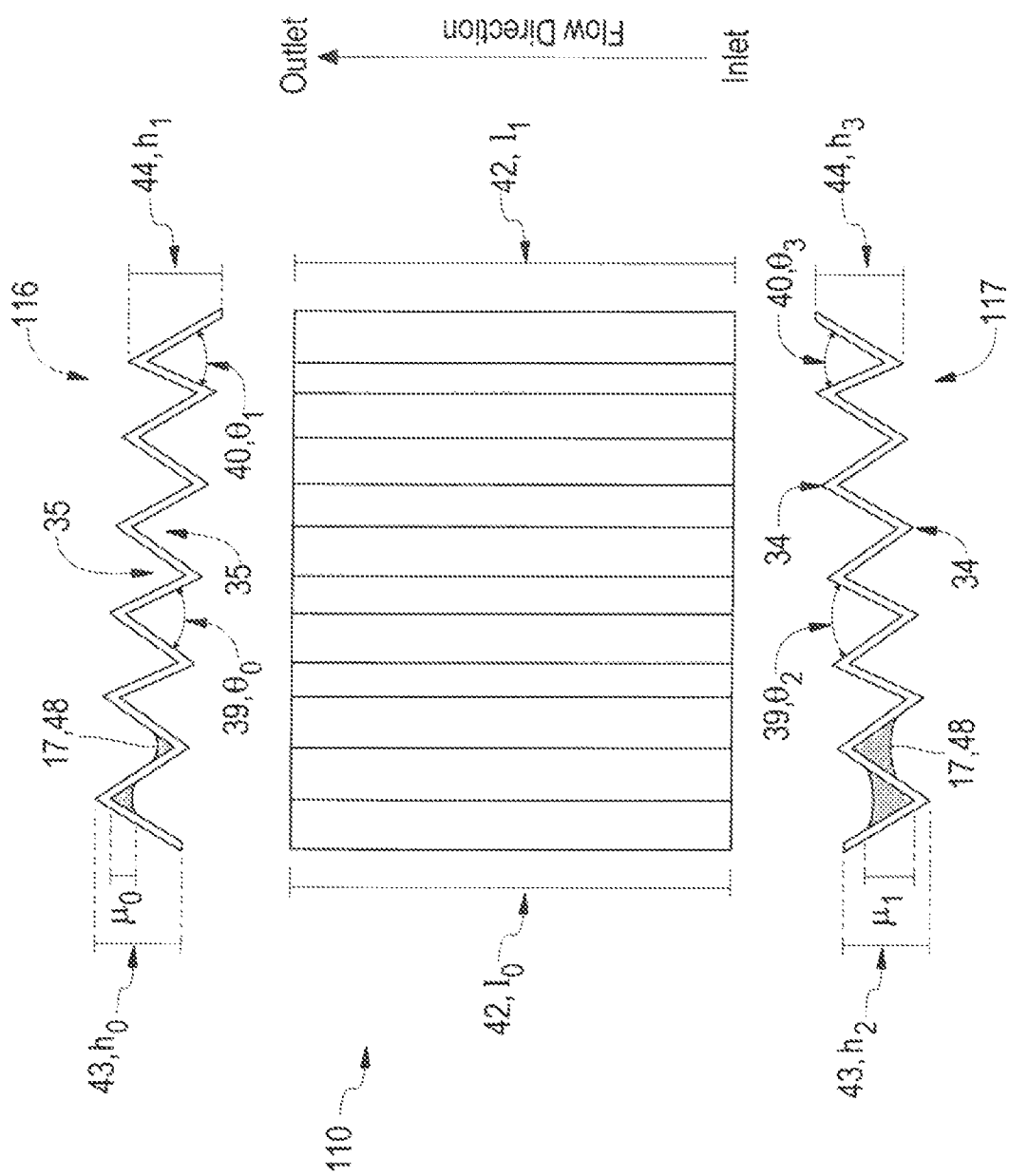
FIG. 10 is a perspective, cut-away view of a microchannel contactor with fluid on two planar surfaces of the contactor.

For microgravity applications where flow visualization may not be required, a two surface planar array may allow for greater gas/liquid direct contact surface an a per unit volume, and reduced structure. An example of a two surface planar array contactor (110) is illustrated in FIG. 10. For example, in a microgravity environment, a corrugated configuration comprising a plurality of alternating ridges (34) and grooves (35) may be used. Additionally, in a two surface planar array, a ridge (34) for a first surface (116) may be a groove for a second surface (117) and vice versa, in this configuration, as a predetermined liquid (such as a liquid sorbent) flows through a two surface planar array adsorption contactor (110), the predetermined liquid (17) may become a thin film of predetermined film thickness on each of the two surfaces. In an embodiment, for a system using DGA as a predetermined liquid (17), operating at a predetermined pressure of 1 atm total pressure, a predetermined temperature of 20° C., and a predetermined ppCO2 of 2 mmHg:

- Film thickness range including $\mu_0$, $\mu_1$ may be about 1-5 mm;
- Corresponding range of heights for a first range of heights (43) including $h_0$, $h_2$ and a second range of heights (44) including $h_1$, $h_3$ may be about 2-20 mm;
- First and second ranges of capillary wedge angles (39, 40) including $\theta_0$, $\theta_2$ and $\theta_1$, $\theta_3$, respectively may be about 10-45 degrees;
- Range of lengths (42) including $l_0$, $l_1$ may be about 2-20 cm; and
- Acceptable materials of construction for the contactor may include: acrylic, glass, and stainless steel.

Variable angle planar array designs may be used to produce a larger capillary gradient between the inlet and the outlet. This capability may be used to accommodate a predetermined liquid (17) with a higher viscosity (for instance), or it may be used to increase the length (and surface area) of each capillary-based contactor element, thus reducing the total number of capillary-based contactor elements required to provide a predetermined amount of surface gas/liquid contact area. As illustrated in FIG. 10, in an embodiment, a two surface version may be used in which the fluid flow directions along surface 116 and surface 117 are in opposing directions. In this embodiment, the entrance ports and the exit ports are on the same edge of the contractor.

Figure 11:
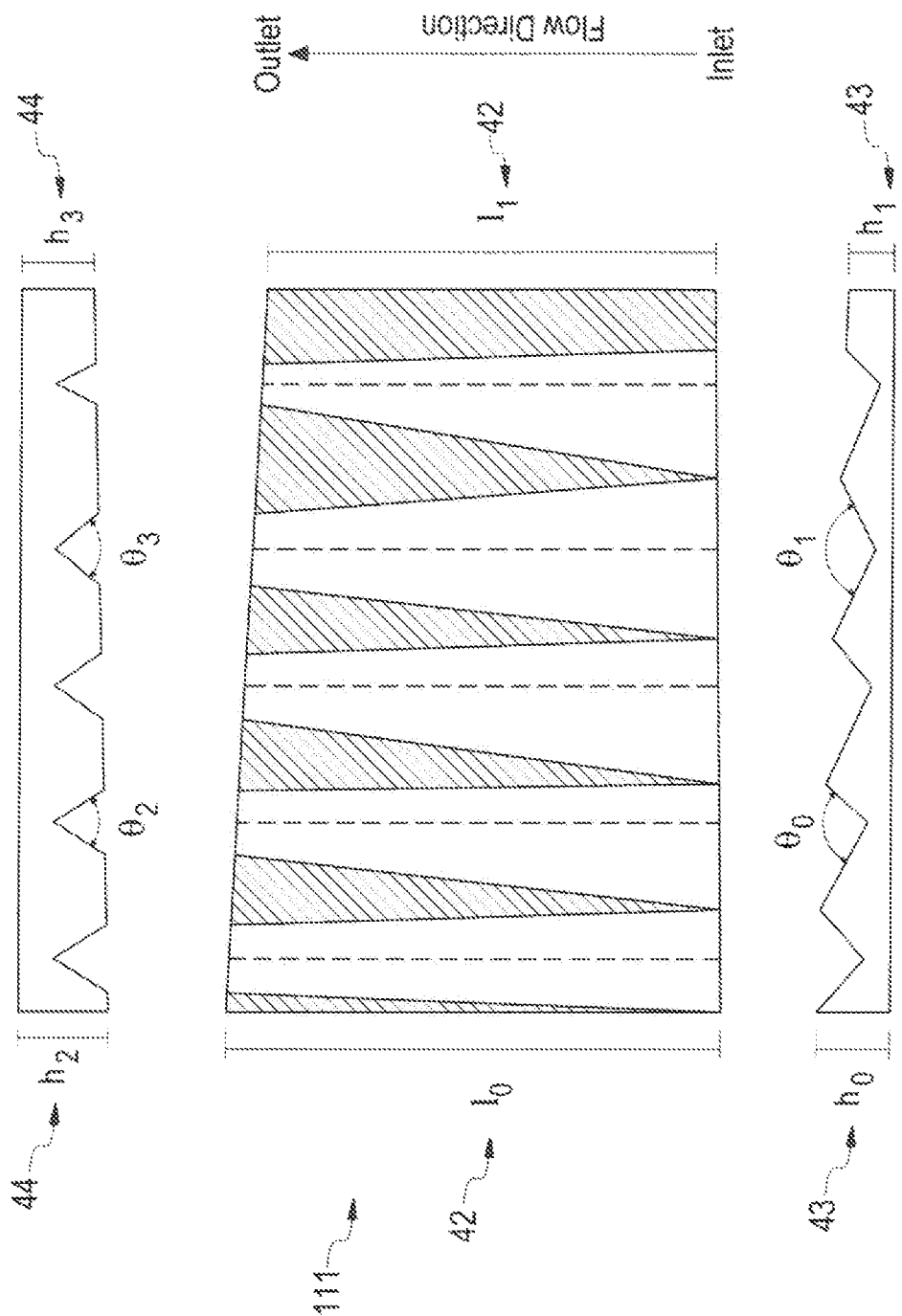
FIG. 11 is a perspective, cut-away view of a microchannel contactor with variable flow lengths and variable contact angles.

In another embodiment. FIG. 11 illustrates a one surface version of a variable angle planar array (111). In an embodiment, a system using DGA, operating at 1 atm total pressure, 20° C. temperature, and 2 mmHg ppCO2:

Film thickness target range may be about 1-8 mm;
Corresponding first range of heights (43) including $h_0$, $h_1$ may be about 2-15 mm;
Corresponding second range of heights (44) including $h_2$, $h_3$ may be about 5-25 mm;
First range of capillary contact angles (39) including $\theta_0$, $\theta_1$ may be about 15-45 degrees;
Second range of capillary contact angles (40) including $\theta_2$, $\theta_3$ may be about 8-30 degrees;
Range of lengths (42) including $l_0$, $l_1$ may be about 3-25 cm; and
Acceptable materials of construction for the contactor may include: acrylic, glass, and stainless steel.

For extremely high air flow velocity systems, such as systems designed to control CO2 to very low levels, radial contactors may be used to reduce the thickness of the gas boundary layer, and enable good contact area packaging with system pressure drop. FIG. 7 illustrates a possible version of a radial contactor design. In an embodiment, for a system using DGA, operating at 1 atm total pressure, 20° C. temperature, and 2 mmHg ppCO2:
Film thickness target range may be about 1-4 mm;
Corresponding range of heights ($h_0$, $h_1$) may be about 2-10 mm;
Range of capillary wedge angles for $\theta_0$, $\theta_1$ may be about 10-30 degrees;
Range of axial length (l) may be about 2-40 cm; and
Acceptable materials of construction for the contactor may include: acrylic, glass, and stainless steel.

Capillary-based desorber contactor designs are similar to capillary-based adsorber contactor designs because the fluid movement aspects of adsorber and desorber sections are similar. Specifically, in an embodiment, fluid flow within the desorber section is not achieved by a means for creating a pressure difference such as a pump. Rather, fluid flow may be achieved through a capillary gradient resulting in capillary action. Desorbers may be enclosed inside one or more sealed housings to capture and contain the evolved gas phase CO2. Desorbers may operate at an elevated temperature, so heat transfer considerations may be factored into desorber designs. There are several different ways to meet the design criteria for a capillary-based desorber contactor element. Three different examples of desorber contactor elements are described and compared in the following section:
Planar array desorber;
Two surface planar array desorber; and
Radial desorber.

Figure 12:
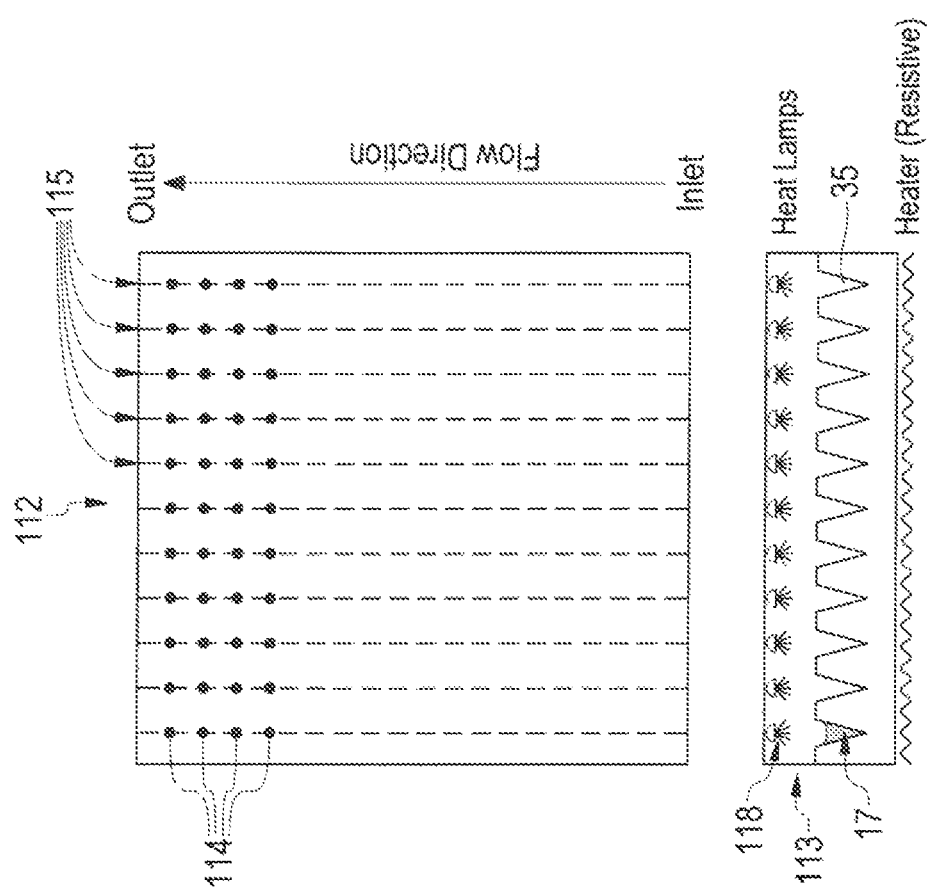
FIG. 12 is a perspective, cut-away view of a microchannel desorber that illustrates possible locations and methods for liquid sorbent heating.

An illustration of a planar array desorber (112) is illustrated in FIG. 12. Capillary designs may be employed to move a slow moving, thin film of a predetermined liquid (17) from desorber inlet to desorber exit The fluid (17) contained in the desorber section (112) and the gas phase head space (118) in contact with the fluid may be enclosed in a sealed housing (113) that captures and contains gas phase CO2 and gas phase water vapor that may be thermally desorbed from the heated predetermined liquid (17). In this design, one or more heaters (114)(such as e.g., a resistive heater) are placed in proximate spatial relationship with at least a predetermined portion of a predetermined one or more grooves (35) associated with a planar array of desorption contactors (115), and thermal desorption is assisted with targeted one or more heaters (114) placed near the exit of the desorber section. Liquid sorbent temperatures are lower temperature at the desorber inlet, and are at the maximum temperature near the desorber exit, to minimize CO2 re-adsorption and improve process efficiency In an embodiment, for a system using DGA, operating at 1.3 atm total pressure, 20 C inlet temperature, and 10% weight loading of CO2 into DGA:
Film thickness target range may be about 2-10 mm;
Corresponding range of heights for $h_0$, $h_1$ may be about 4-30 mm;
Range of capillary wedge angles for $\theta_0$, $\theta_1$ may be about 10-45 degrees;
Range of length (l) may be about 4-20 cm;
Temperature range of DGA at desorber exit may be about 70-140° C.; and
Acceptable materials of construction for the contactor may include: glass, and stainless steel.

Figure 13:
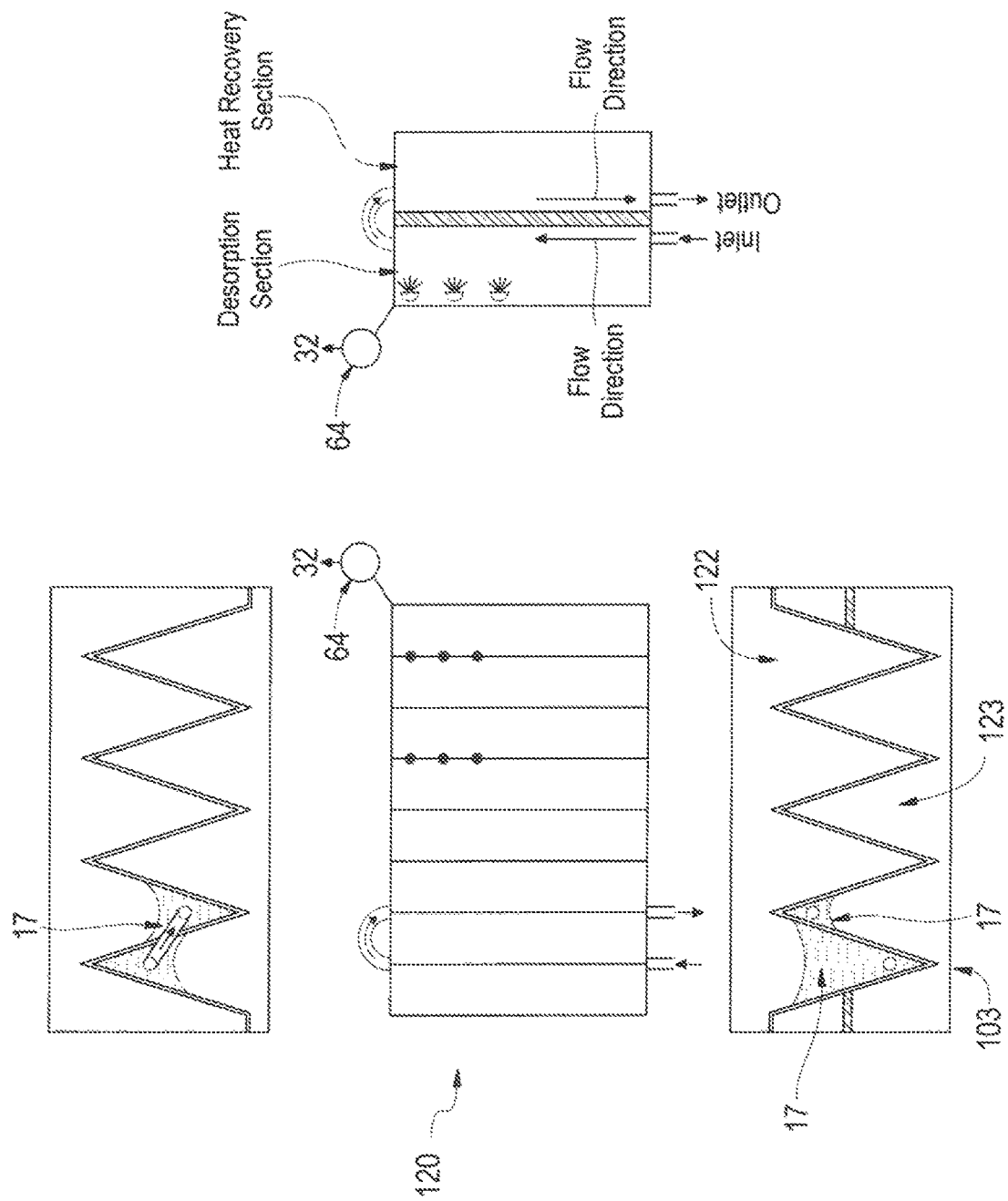
FIG. 13 is perspective, cut-away view of a two surface planar array desorber capable of direct air to liquid contact under microgravity conditions.

An illustration of a two surface planar array desorber (120) is shown in FIG. 13. Capillary techniques are used to move a slow moving, thin film of liquid sorbent from desorber inlet to desorber exit. In this embodiment, the desorber may be enclosed in an enclosure (103) such as a sealed housing that captures and contains the gas phase CO2 and gas phase water vapor (122) which may be thermally desorbed from the heated liquid sorbent (17). In an embodiment, there may be free volume for gas phase products on the desorption side of the planar array (122) and on the thermal recovery planar array (123). The flow path of the liquid sorbent in the two surface planar array desorber may be "out and back". The outward leg may be used to heat the sorbent, and the return leg may be used for energy recovery. The returning liquid transfers its heat to the incoming liquid. For a system using DGA, operating at 1.3 atm total pressure, 20 C inlet temperature, and 10% weight loading of CO2 into DGA:
Film thickness target range may be about 2-10 mm;
Corresponding range of heights for $h_0$, $h_1$ may be about 4-30 nm;
Range of capillary wedge angles $\theta_0$, $\theta_1$ may be about 10-45 degrees;
Range of length (l) may be about 4-20 cm;
Temperature range of DGA at desorber exit may be about 70-140 C; and
Acceptable materials of construction for the contactor may include: glass, and stainless steel.

Radial desorber designs are more complicated to fabricate, but heat transfer efficiency may be improved because there may be increased contact area between the outward heating surface and inward cooling surface. The head space for the vapor phase CO2 and H2O may be more tightly packaged, more easily heated, and condensation concerns may be addressed. The return fluid flow path may be designed to be liquid only, so fluid movement may be controlled with traditional pressure difference methods. Liquid sorbent temperatures are ambient at the desorber inlet, and at the maximum temperature near the end of the "outward leg". For a system using DGA, operating at 1.3 atm total pressure, 20 C inlet temperature, and 10% weight loading of CO2 into DGA:
Film thickness target range may be about 2-10 mm;
Corresponding range of heights $h_0$, $h_1$ may be about 5-35 mm;
Range of capillary wedge angles for $\theta_0$, $\theta_1$ may be about 10-30 degrees;
Range of length (l) may be about 4-20 cm;
Temperature range of DGA at desorber exit may be about 70-140° C.; and
Acceptable materials of construction for the contactor may include: glass, and stainless steel.

With particular reference to FIG. 2, operational methods for an embodiment of a liquid sorbent-based CO2 removal apparatus (10) will now be described. A predetermined liquid (17) may be loaded into the container (12). After activation, the pump (11) provides a means for recirculating the predetermined liquid (17) through predetermined portions of the apparatus (10). In an embodiment, the pump (11) may be a rotary pump. The pump (11) also provides a means for regulating one or more flow rates within predetermined portions of the apparatus (10) including the flow rate for the predetermined liquid (17) entering the adsorber and desorber sections (121.54). In an embodiment, the one or more valves (13) may be comprised of one or more metering valves wherein the one or more metering valves are installed downstream of the pump (11) within the apparatus (10). Additionally, the one or more valves (13) may provide a means for regulating one or more flow rates within predetermined portions of the apparatus (10). In an embodiment, the one or more valves (13) are solenoid valves capable of closing off a recirculating loop (27) to purge the apparatus (10) of potential air bubbles by withdrawing trapped air. In an embodiment, the recirculating loop (27) may be comprised of the pump (11), the container (12), one or more valves (13), one or more gauges (15), one or more pressure regulators (14), and the adsorber and desorber sections (121.54). A purge loop (45) may be created within the apparatus (10) allowing predetermined flow of the predetermined liquid (17) during a purge. In an embodiment, the purge loop (45) may be comprised of the pump (11), one or more valves (13), the container (12), and one or more means for conveying fluids (18). In an embodiment, the step of withdrawing trapped air may be accomplished by the use of a syringe to remove trapped air from the container (12). In an embodiment, an orifice (21) may be installed at a predetermined location within the means for conveying fluids (18) in the recirculating loop (27). The orifice (21) may be a means for providing a predetermined flow resistance and delivering the predetermined liquid (17) within the apparatus (10). One or more gauges (15) may be operationally incorporated within the apparatus (10) atone or more predetermined locations. The one or more gauges (15) may be a means for monitoring a predetermined aspect (such as e.g., flow rate, pressure, pressure differential, etc.) of the apparatus (10) during operation. One or more pressure regulators (14) may be operationally incorporated within the apparatus (10) at one or more predetermined locations. In an embodiment, a pressure regulator (14) may be installed upstream of the adsorber section (121) wherein the pressure regulator (14) may be capable of providing a substantially constant pressure approximately near the outlet of the pump (11).

With particular reference to FIGS. 2-5, during operations under microgravity conditions, as a predetermined liquid (17) enters an adsorber section (53, 73, 93, 121) from a first predetermined location (56, 76)(or a desorber section (54, 74, 94, 122) from a second predetermined location (57, 77)) in a one or more recirculating loop (27), capillary action resulting from a predetermined capillary gradient may result in a capillary fluid flow of the predetermined liquid (17) across one or more adsorption contactor elements (62, 82) or desorption contactor elements (63,83). Capillary action resulting from a predetermined capillary gradient (resulting from a predetermined surface design of the one or more adsorption contactor elements) may result in capillary fluid flow of the predetermined liquid (17) away from one or more inputs (46) and towards one or more outputs (47). At least partially due to capillary physics, a relatively thin film (48) of the predetermined liquid (17) may form on the one or more adsorption contactor elements (62, 82) or desorption contactor elements (63,83) as the predetermined liquid (17) moves or flows from the one or more inputs (46) to the one or more outputs (47). The combination of a predetermined surface design of the one or more adsorption contactor elements (62, 82) (or desorption contactor elements (63,83)) and a resultant capillary fluid flow may allow for direct contact between a predetermined environment or cabin air (49) and predetermined liquid (17) (e.g., direct contact between the predetermined liquid and a cabin air environment). The thin film (48) provides a means for exposing the predetermined liquid (17) to the predetermined environment or cabin air (49) under microgravity conditions. The thickness of the thin film (48) at predetermined points along the one or more adsorption contactor elements (25) or desorption contactor elements (63,83) may be monitored and adjusted during operations. In an embodiment, the predetermined environment (49) may be comprised of a gaseous environment. In an embodiment, the predetermined environment (49) may be comprised of air wherein the air may be comprised of $CO_2$. In an embodiment, the flow rate of the predetermined liquid (17) as it enters adsorber section (53, 73, 93, 121) or desorber section (54, 74, 94,) may be substantially equivalent to the flow rate of the predetermined liquid (17) as it exits an adsorber section (53, 73, 93, 121) or desorber section (54, 74, 94), respectively. In an embodiment, assuming the flow rate of the predetermined liquid (17) as it enters the adsorber section (53, 73, 93, 121) may be substantially equivalent to the flow rate as the predetermined liquid (17) exits adsorber section (53, 73, 93, 121), the one or more contactor elements (61) in combination with a predetermined liquid (17) are a means for providing a substantial amount of surface area along the gas/liquid (17) free surface in which $CO_2$ may be adsorbed from the predetermined environment (49). Similarly, assuming the flow rate of the predetermined liquid (17) as it enters the desorber section (54, 74, 94, 122) may be substantially equivalent to the flow rate as the predetermined liquid (17) exits desorber section (54, 74, 94), the one or more contactor elements (61) in combination with a predetermined liquid (17) are a means for providing capillary action in which $CO_2$ may be desorbed into the predetermined environment (54, 74, 94). $CO_2$ may be adsorbed by the predetermined liquid (17) or desorbed into the predetermined environment (54, 74,94) as the predetermined environment (54,74,94) may be in direct contact with the predetermined liquid (17). In an embodiment, a pump (11) may be used to control the flow rate of the predetermined liquid (17) as it enters an adsorber section (53, 73, 93, 121) or desorber section (54, 74, 94). Thus, the resultant rate of liquid surface area exposure time to the predetermined environment (49) inside the adsorber section (53, 73, 93, 121) or desorber section (54, 74, 94) may be a function of the flow rate of the predetermined liquid (17) as it enters the respective section. When liquid surface area is being regenerated at a rate substantially equal to the rate of $CO_2$ adsorption in the predetermined liquid (17), a system may be considered at equilibrium. In an embodiment, the rate of liquid exposure time to the surface area may be predetermined.

In an embodiment, a desorber section (53, 73, 93, 121) may be enclosed in a sealed housing (103). In an embodiment, increasing the temperature and/or decreasing the pressure in the desorber section causes a shift in chemical equilibrium thereby releasing gas phase $CO_2$ and gas phase water. Means for increasing temperature may comprise one or more heaters (114) (such as e.g., a resistive heater). Means for decreasing pressure may comprise one or more pumps. In an embodiment, a combination of one or more heating elements (114) may be capable of heating a predetermined liquid (17) to a predetermined temperature or range of temperatures. Similarly, in an embodiment, one or more pumps may be capable of decreasing the pressure in the desorber section to a predetermined pressure or range of pressures.

As used herein, the indefinite and definite articles "a" and "the," respectively are synonymous with "one or more." Further, as used herein, adsorber and adsorption are synonymous. Additionally, as used herein, desorber and desorption are synonymous. While specific embodiments have been shown and described, it is to be understood that numerous changes and modification may be made without departing from the scope and spirit of the invention.

What is claimed is:

1. An apparatus capable of adsorbing one or more predetermined gases from a first environment and desorbing said one or more predetermined gases in a second environment comprising:
   one or more fluid loops capable of fluid flow wherein said one or more fluid loops comprise one or more adsorber and desorber sections; and
   a predetermined liquid capable of flowing within said one or more fluid loops and adsorbing said one or more predetermined gases from said first environment,
   wherein said adsorber section is comprised of:
      an adsorption inlet;
      an adsorption outlet; and
      one or more adsorber contactors capable of enabling capillary fluid flow of said predetermined liquid from said adsorption inlet to said adsorption outlet, wherein said predetermined liquid is in direct contact with said first environment in said adsorber section, and
   wherein said desorber section is comprised of:
      a desorber inlet;
      a desorber outlet;
      an enclosure capable of capturing and containing said one or more predetermined gases; and
      one or more desorber contactors capable of enabling capillary fluid flow of said predetermined liquid from said desorber inlet to said desorber outlet, wherein said one or more predetermined gases are desorbed from said predetermined liquid into said second environment.

2. The apparatus claimed in claim 1,
   wherein said fluid flow is achieved through a means for creating a pressure difference in said one or more loops, and
   wherein said fluid flow is not achieved through a means for creating a pressure difference in said one or more adsorber and desorber sections.

3. The apparatus claimed in claim 1,
   wherein said capillary fluid flow is achieved through a predetermined capillary gradient in at least one of said adsorber and desorber sections.

4. The apparatus claimed in claim 1,
   wherein said one or more predetermined gases is carbon dioxide.

5. The apparatus claimed in claim 1,
   wherein said first environment is comprised of microgravity and cabin air in a space vehicle, and
   wherein said second environment is comprised of microgravity.

6. The apparatus claimed in claim 1,
   wherein said one or more adsorber contactors are configured in a planar array.

7. The apparatus claimed in claim 6,
   wherein said planar array is comprised of a corrugated configuration comprising a plurality of alternating ridges and grooves.

8. The apparatus claimed in claim 7,
   wherein each of said plurality of ridges is comprised of a predetermined first range of predetermined ridge heights and a ridge top of predetermined range of widths.

9. The apparatus claimed in claim 7,
   wherein each of said plurality of grooves is comprised of a predetermined range of capillary wedge angles.

10. The apparatus claimed in claim 1,
    wherein said one or more adsorber contactors are configured in a two surface planar array comprising a first surface and a second surface.

11. The apparatus claimed in claim 10,
    wherein said two surface planar array is comprised of a corrugated configuration comprising a plurality of alternating ridges and grooves, and
    wherein a ridge for said first surface is a groove for said second surface and vice versa.

12. The apparatus claimed in claim 11,
    wherein each of said plurality of grooves for said first and second surfaces is comprised of a predetermined range of capillary wedge angles.

13. The apparatus claimed in claim 1,
    wherein said one or more desorber contactors are configured in a planar array, and
    wherein said planar array is comprised of a corrugated configuration comprising a plurality of alternating ridges and grooves.

14. The apparatus claimed in claim 13,
    wherein said desorber section is further comprised of:
       one or more heating elements configured in proximate spatial relationship with at least a predetermined portion of said plurality of alternating ridges and grooves.

15. A method for separating carbon dioxide from a gaseous stream containing carbon dioxide, the method comprising the steps of:
    providing an apparatus comprising:
       a means for conveying a predetermined fluid wherein said means for conveying contains said predetermined fluid;
       a pump operationally connected to said means for conveying wherein said pump is capable of flowing said predetermined fluid within said means for conveying;
       an adsorber operationally connected to said means for conveying, wherein said adsorber is comprised of one or more first contactors, a first input, and a first output, and wherein said one or more first contactors are each comprised of a first solid surface; and
       a desorber operationally connected to said means for conveying wherein said desorber is comprised of one or more second contactors, a second input, and a second output, and wherein said one or more second contactors are each comprised of a second solid surface;
    using said pump to flow said predetermined fluid through said means for conveying to said first input wherein as said predetermined fluid enters said adsorber, said predetermined fluid spreads into a first thin film wherein said first thin film attaches to at least one first solid surface;
    using capillary action to flow said first thin film from said first input to said first output;

exposing said first thin film to said gaseous stream wherein said first thin film adsorbs a first predetermined amount of carbon dioxide;

using said pump to flow said predetermined fluid from said first output through said means for conveying to said second input, wherein as said predetermined fluid enters said desorber, said predetermined fluid spreads into a second thin film, and wherein said second thin film attaches to at least one second solid surface;

using capillary action to flow said second thin film from said second input to said second output;

thermally desorbing a second predetermined amount of carbon dioxide from said second thin film as said second thin film flows from said second input to said second output; and using said pump to flow said predetermined fluid from said second output to said means for conveying.

16. The method of claim 15, further comprising the step of:

locating said apparatus in outer space.

17. The method of claim 15, further comprising the step of:

exposing said apparatus to microgravity.

* * * * *